United States Patent
Suzuki

(10) Patent No.: US 11,868,667 B2
(45) Date of Patent: Jan. 9, 2024

(54) IMAGE FORMING APPARATUS, SERVER AND CONTROL METHOD THEREFOR

(71) Applicant: BROTHER KOGYO KABUSHIKI KAISHA, Nagoya (JP)

(72) Inventor: Takashi Suzuki, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/470,395

(22) Filed: Sep. 9, 2021

(65) Prior Publication Data
US 2022/0100436 A1   Mar. 31, 2022

(30) Foreign Application Priority Data
Sep. 30, 2020 (JP) .................. 2020-164966

(51) Int. Cl.
G06F 3/12 (2006.01)
G06K 15/00 (2006.01)

(52) U.S. Cl.
CPC .......... G06F 3/1203 (2013.01); G06F 3/1229 (2013.01); G06K 15/4075 (2013.01)

(58) Field of Classification Search
CPC .. G06F 3/1203; G06F 3/1229; G06K 15/4075
See application file for complete search history.

(56) References Cited

U.S. PATENT DOCUMENTS

| 2012/0230709 A1* | 9/2012 | Sakaguchi ......... G03G 15/0856 399/27 |
| 2017/0078516 A1* | 3/2017 | Ishizaki ............. G06Q 30/0283 |
| 2018/0131831 A1 | 5/2018 | Tolia et al. |

FOREIGN PATENT DOCUMENTS

| CN | 107819973 A | * | 3/2018 | ............. G06F 21/34 |
| JP | 2001318776 A | * | 11/2001 | |

* cited by examiner

Primary Examiner — Huo Long Chen
(74) Attorney, Agent, or Firm — Merrchaant & Gould P.C.

(57) ABSTRACT

An image forming apparatus includes a memory and a controller. The memory stores first mode information indicating whether the apparatus is set to a contract mode or a normal mode, and second mode information indicating whether a print permission mode is active or inactive. The controller sets the second mode information to active information indicating that the print permission mode is active in a state in which the first mode information indicates the normal mode, sets the second mode information to inactive information indicating that the print permission mode is inactive in a state in which the first mode information indicates the contract mode, and rewrites the second mode information to the active information when an instruction to activate the print permission mode is received in a state in which the first mode information indicates the contract mode and the second mode information is set to the inactive information.

13 Claims, 8 Drawing Sheets

IMAGE FORMING APPARATUS, SERVER AND CONTROL METHOD THEREFOR

CROSS-REFERENCE TO RELATED APPLICATION

This application claims priority under 35 U.S.C. § 119 from Japanese Patent Application No. 2020-164966 filed on Sep. 30, 2020. The entire subject matter of the application is incorporated herein by reference.

BACKGROUND

Technical Field

Aspects of the present disclosure relate to an image forming apparatus, a server and a control method therefor.

Related Art

There is known a subscription service in which, when a user subscribes to, an ink cartridge or a toner cartridge to be attached to a registered printer is periodically delivered to the user as a subscription cartridge. In such a service, the use of the subscription cartridge is limited only in the printer registered to the subscription service. On the other hand, in the printer registered to the subscription service, not only the subscription cartridge but also a normal cartridge can be used.

SUMMARY

In the above-described technology, in a case where a remaining amount of coloring agent accommodated in the subscription cartridge mounted to the printer becomes equal to or less than a certain threshold value, the subscription cartridge is shipped to the user as a supply item. However, in a case where it is determined based on the remaining amount of the coloring agent that the cartridge should be replaced, printing is not permitted.

As an operation mode of the printer, print permission mode is known in which printing can be permitted even in a case where it is determined that the remaining amount of the coloring agent in the cartridge mounted to the printer is in a state in which the cartridge should be replaced. In a printer for which a service contract is not made, the print permission mode may be activated. On the other hand, in a printer for which the service contract is made, the print permission mode may be inactivated.

According to aspects of the present disclosure, there is provided an image forming apparatus including a main body memory and a controller. The main body memory is configured to store first mode information indicating whether the image forming apparatus is set to a contract mode being for the image forming apparatus for which a service contract is made or a normal mode being for the image forming apparatus for which a service contract is not made, and second mode information indicating whether a print permission mode for permitting printing with the image forming apparatus even in a case where it is determined that an amount of remaining coloring agent contained in a cartridge mounted to the image forming apparatus is in a state in which the cartridge should be replaced is active or inactive. The controller is configured to execute setting the second mode information to active information indicating that the print permission mode is active in a state in which the first mode information indicates the normal mode, setting the second mode information to inactive information indicating that the print permission mode is inactive in a state in which the first mode information indicates the contract mode, and rewriting the second mode information from the inactive information to the active information in a case where a first instruction to activate the print permission mode is received in a state in which the first mode information indicates the contract mode and the second mode information is set to the inactive information.

According to aspects of the present disclosure, there is further provided a server communicable with an image forming apparatus. The server includes a controller configured to execute switching of the print permission mode in the image forming apparatus from inactive to active in a case where a remaining amount decrease notification indicating that the amount of remaining coloring agent is equal to or less than a dispatch threshold is received from the image forming apparatus, in a state in which the image forming apparatus is set to a contract mode being for the image forming apparatus for which a service contract is made and in which a print permission mode for permitting printing with the image forming apparatus even in a case where it is determined that an amount of remaining coloring agent contained in a cartridge mounted to the image forming apparatus is a state in which the cartridge is to be replaced is inactive.

According to aspects of the present disclosure, there is further provided an image forming system including an image forming apparatus including a main body memory and a first controller, and a server communicable with the image forming apparatus and including a second controller. The main body memory is configured to store first mode information indicating whether the image forming apparatus is set to a contract mode being for the image forming apparatus for which a service contract is made or a normal mode being for the image forming apparatus for which a service contract is not made, and second mode information indicating whether a print permission mode for permitting printing with the image forming apparatus even in a case where it is determined that an amount of remaining coloring agent contained in a cartridge mounted to the image forming apparatus is in a state in which the cartridge should be replaced is active or inactive. The first controller is configured to execute setting the second mode information to active information indicating that the print permission mode is active in a state in which the first mode information indicates the normal mode, setting the second mode information to inactive information indicating that the print permission mode is inactive in a state in which the first mode information indicates the contract mode, and rewriting the second mode information from the inactive information to the active information in a case where a first instruction to activate the print permission mode is received in a state in which the first mode information indicates the contract mode and the second mode information is set to the inactive information. The second controller is configured to execute switching of the print permission mode in the image forming apparatus from inactive to active in a case where a remaining amount decrease notification indicating that the amount of remaining coloring agent is equal to or less than a dispatch threshold is received from the image forming apparatus in a state in which the image forming apparatus is set to the contract mode and in which the print permission mode is inactive.

According to aspects of the present disclosure, there is further provided a method of controlling an image forming apparatus. First mode information is information indicating whether the image forming apparatus is set to a contract mode being for the image forming apparatus for which a service contract is made or a normal mode being for the image forming apparatus for which a service contract is not made. Second mode information is information indicating whether a print permission mode for permitting printing with the image forming apparatus even in a case where it is determined that an amount of remaining coloring agent contained in a cartridge mounted to the image forming apparatus is in a state in which the cartridge should be replaced is active or inactive. The control method includes setting the second mode information to active information indicating that the print permission mode is active in a state in which the first mode information indicates the normal mode, setting the second mode information to inactive information indicating that the print permission mode is inactive in a state in which the first mode information indicates the contract mode, receiving a first instruction to activate the print permission mode in a state in which the first mode information indicates the contract mode and the second mode information indicates that the print permission mode is inactive, and rewriting the second mode information from the inactive information to the active information after receiving the first instruction.

BRIEF DESCRIPTION OF THE ACCOMPANYING DRAWINGS

DETAILED DESCRIPTION

Configuration of Image Forming System 100

Figure 1:
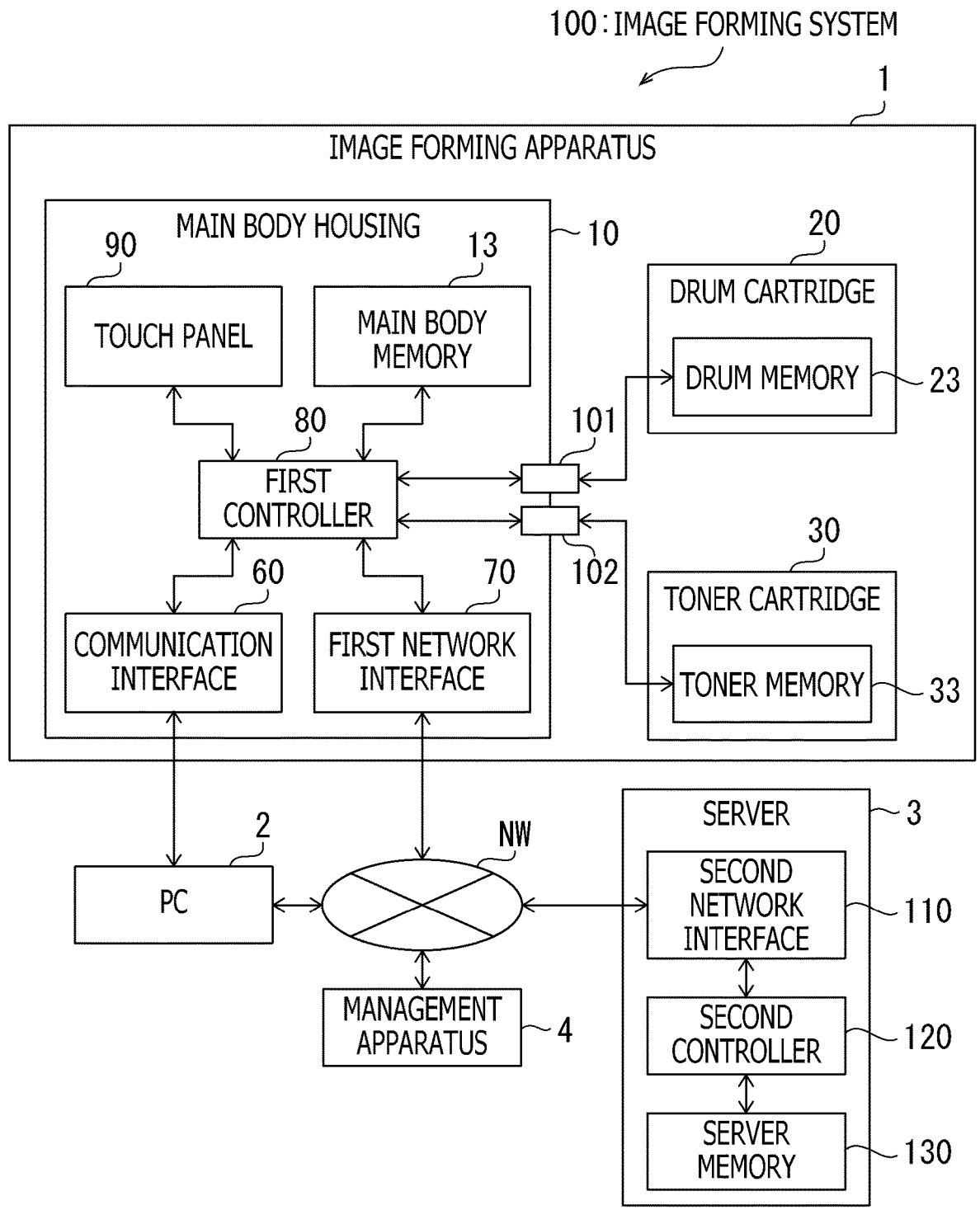
FIG. 1 is a block diagram illustrating an example of a configuration of an image forming system.

FIG. 1 is a block diagram illustrating an example of a configuration of an image forming system 100 according to an embodiment of the present disclosures. As illustrated in FIG. 1, the image forming system 100 includes an image forming apparatus 1, a personal computer (PC) 2, a server 3, and a management apparatus 4. The image forming apparatus 1 is communicably connected to the PC 2. The image forming apparatus 1 and the PC 2 are communicably connected to the server 3 via a network NW. Instead of the PC 2, a portable information terminal such as a smartphone may be used. The server 3 is communicably connected to the management apparatus 4 of a warehouse via the network NW.

Configuration of Image Forming Apparatus 1

Figure 2:
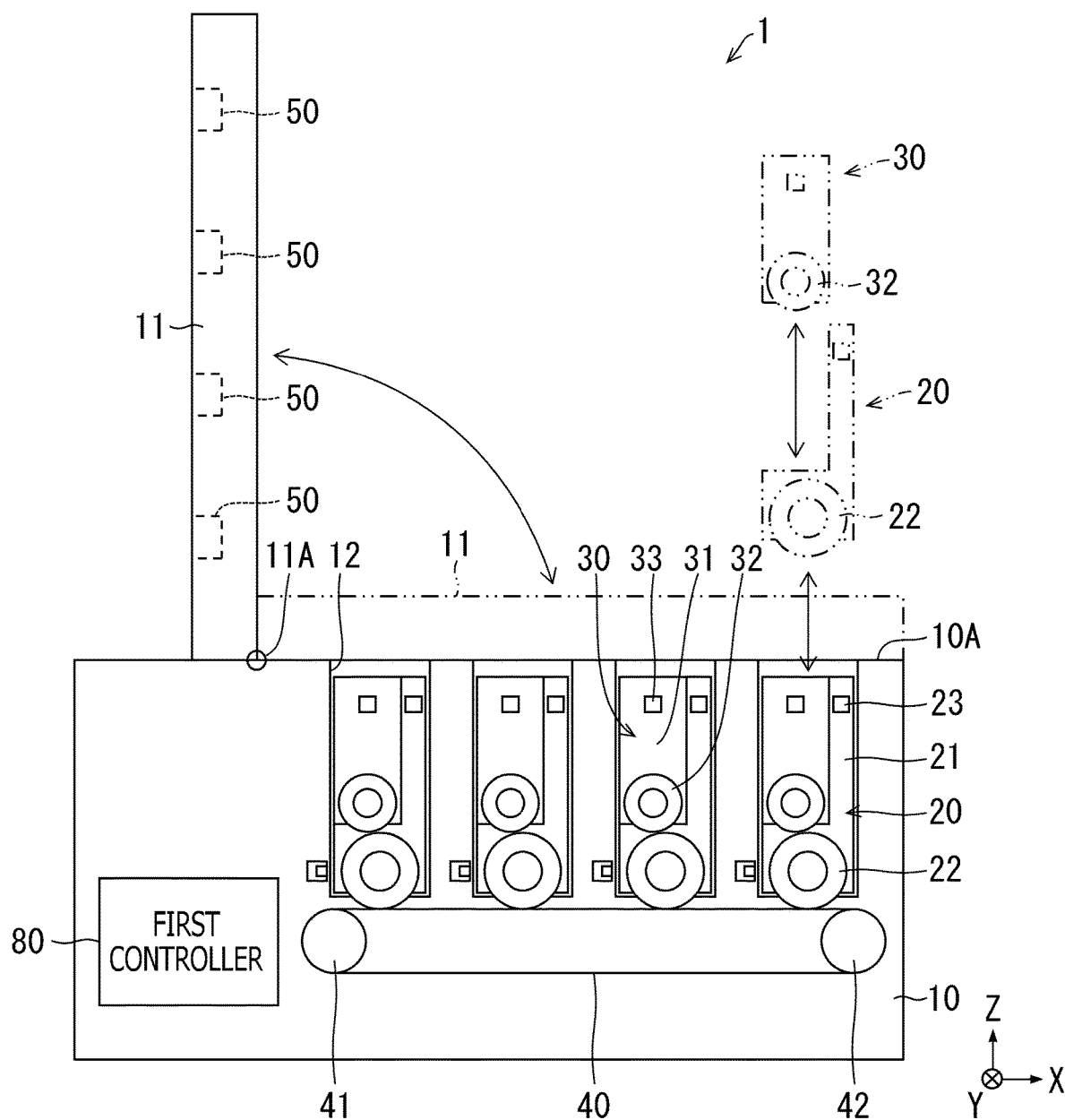
FIG. 2 is a schematic diagram illustrating example of a configuration of an image forming apparatus.

FIG. 2 is a schematic diagram illustrating an example of a configuration of the image forming apparatus 1. In FIG. 2, a direction in which drum cartridges 20 are arranged is referred to as an X direction, a direction from a transfer belt 40 toward a cover 11 in a state where the cover 11 is closed is referred to as a Z direction, and a direction orthogonal to both the X direction and the Z direction is referred to as a Y direction.

The image forming apparatus 1 is an electrophotographic printer. An example of the image forming apparatus 1 is an LED (Light Emitting Diode) printer. As illustrated in FIGS. 1 and 2, the image forming apparatus 1 includes a main body housing 10, a cover 11, drum cartridges 20, toner cartridges 30, a transfer belt 40, light sources 50, a main body memory 13, a communication interface 60, a first network interface 70, a first controller 80, and a touch panel 90.

The main body housing 10 is formed in a rectangular box shape. The main body housing 10 accommodates four drum cartridges 20, four toner cartridges 30, the transfer belt 40, and the first controller 80. In the main body housing 10, four cartridge holders 12 are formed in concave shapes. The drum cartridges 20 and the toner cartridges 30 are mounted to the main body housing 10 by being held by the cartridge holders 12, respectively. The touch panel 90 is provided on an outer surface of the main body housing 10. Instead of the touch panel 90, one or more display devices such as a liquid crystal display or a lamp and one or more input interfaces such as buttons may be separately provided.

The cover 11 opens and closes an opening 10A formed at an upper end of the main body housing 10. The cover 11 is rotatable about a rotation axis 11A extending in the Y direction between an open position, indicated by a solid line in FIG. 2, at which the cover 11 opens the opening 10A and a closed position, indicated by a chain double-dashed line in FIG. 2, at which the cover 11 closes the opening 10A.

When the cover 11 is at the open position, openings of the cartridge holders 12 are open. When the cover 11 is at the closed position, the openings of the cartridge holders 12 are covered by the cover 11. A not-shown closing sensor is provided to the opening 10A of the main body housing 10. The closing sensor is a sensor that detects that the cover 11 is at the closed position. The closing sensor may be, for example, a contact sensor or an optical sensor.

The drum cartridges 20 are mountable to the main body housing 10. Each drum cartridge 20 includes a cartridge housing 21, a photosensitive drum 22, and a drum memory 23. The photosensitive drum 22 and the drum memory 23 are provided to the cartridge housing 21.

The photosensitive drum 22 is a component used to perform image formation, and is a replacement component that needs to be replaced because deterioration such as surface wear occurs with use. The photosensitive drum 22 is a cylindrical photosensitive member extending in the Y direction, and is rotatable about a drum axis extending in the Y direction. An outer peripheral surface of the photosensitive drum 22 is covered with photosensitive material.

The drum memory 23 is a readable and writable memory. The drum memory 23 is, for example, a flash ROM (Read Only Memory) or an EEPROM (Electronically Erasable and Programmable Read Only Memory). The drum memory 23 stores, for example, a drum ID, drum life information, and drum identification information as information related to the photosensitive drum 22.

The drum ID is a unique serial number for identifying each drum cartridge 20. The drum life information is, for example, at least one of a cumulative number of rotations of the photosensitive drum 22 and a cumulative number of printed sheets using the photosensitive drum 22. The cumulative number of rotations of the photosensitive drum 22 and the cumulative number of printed sheets using the photosensitive drum 22 are calculated by incrementing or decrementing, for each drum cartridge 20 identified by the drum ID, each time printing is performed.

The drum identification information is information indicating whether the drum cartridge 20 is a contract product or a normal product. The contract product can be used in the image forming apparatus 1 in a contract mode being for the image forming apparatus 1 for which a service contract is made, and cannot be used in the image forming apparatus 1 in a normal mode being for the image forming apparatus 1 for which a service contract is not made. The normal product can be used in the image forming apparatus 1 in both the contract mode and the normal mode.

In the service, the drum cartridge 20 and the toner cartridge 30 being the contract products are automatically delivered to the user based on the life information stored in the main body memory 13, and the user can use the contract products.

The drum memory 23 may store the following other information in addition to the drum ID, the drum life information, and the drum identification information. The other information is information such as models compatible with the drum cartridge 20, specification of the drum cartridge 20, information indicating whether or not the drum cartridge 20 is an unused product, and an error history of the drum cartridge 20. Similar information may be stored in the toner memory 33.

The toner cartridges 30 are mountable to the main body housing 10. Each toner cartridge 30 is integrated with the drum cartridge 20 by being mounted to the drum cartridge 20. That is, the toner cartridge 30 is mounted to the main body housing 10 together with the drum cartridge 20 in a state in which the toner cartridge 30 is mounted to the drum cartridge 20. The toner cartridge 30 includes a cartridge housing 31, a developing roller 32, and a toner memory 33. The developing roller 32 and the toner memory 33 are provided to the cartridge housing 31. The cartridge housing 31 contains toner.

The four cartridge housings 31 contain toners of mutually different colors as materials used for image formation. For example, the four cartridge housings 31 contain toner of cyan, magenta, yellow, and black, respectively. Toner of one color is stored in one cartridge housing 31. Toner is a consumable that is consumed with use.

The developing roller 32 is a cylindrical member extending in the Y direction, and is rotatable about a developing axis extending in the Y direction. In a state where the toner cartridge 30 is mounted to the drum cartridge 20, an outer peripheral surface of the developing roller 32 contacts the outer peripheral surface of the photosensitive drum 22.

The toner memory 33 is a readable and writable memory. The toner memory 33 is, for example, a flash ROM or an EEPROM. The toner memory 33 stores, for example, a toner ID, toner life information, and toner identification information as information related to the toner cartridge 30.

The toner ID is a unique serial number for identifying each toner cartridge 30. The toner life information is, for example, at least one of the cumulative number of rotations of the developing roller 32, the cumulative number of printed sheets using the developing roller 32, and the cumulative number of printed dots using the developing roller 32.

The cumulative number of rotations of the developing roller 32 is calculated by incrementing or decrementing, for each toner cartridge 30 identified by the toner ID, every time printing is performed. The cumulative number of printed sheets using the developing roller 32 and the cumulative number of printed dots using the developing roller 32 are calculated in the same manner as the cumulative number of rotations of the developing roller 32.

The toner identification information is information indicating whether the toner cartridge 30 is a contract product or a normal product. The meaning of the contract product and the normal product in the toner cartridge 30 is the same as the meaning of the contract product and the normal product in the drum cartridge 20.

As shown in FIG. 2, the drum cartridges 20 and the toner cartridges 30 are mounted to the main body housing 10 in a state where the cover 11 is at the open position. In this state, the drum cartridges 20 and the toner cartridges 30 are inserted into the corresponding cartridge holders 12 through the opening 10A.

As shown in FIG. 1, the main body housing 10 includes a connector 101 and a connector 102. When the connector 101 is electrically connected to the drum memory 23 in a state in which the drum cartridge 20 is inserted into the cartridge holder 12, the first controller 80 of the main body housing 10 can communicate with the drum memory 23 of the drum cartridge 20.

When the connector 102 is electrically connected to the toner memory 33 in a state in which the toner cartridge 30 is mounted to the main body housing 10, the first controller 80 of the main body housing 10 can communicate with the toner memory 33 of the toner cartridge 30.

The transfer belt 40 is a component that transfers toner on the surface of the photosensitive drums 22 to the printing sheet. The transfer belt 40 is a replacement part that needs to be replaced because deterioration such as surface wear occurs with use. The transfer belt 40 is an annular belt that can contact the photosensitive drums 22. The outer peripheral surfaces of the photosensitive drums 22 can contact the outer peripheral surface of the transfer belt 40. During the printing process, the printing sheet is conveyed between the transfer belt 40 and the photosensitive drums 22.

The transfer belt 40 is wound around a drive roller 41 and a driven roller 42. The drive roller 41 drives the transfer belt 40. The first controller 80 rotates the drive roller 41. The driven roller 42 rotates in accordance with movement of the transfer belt 40 caused by the driving of the drive roller 41.

The four light sources 50 are attached to an inner surface of the cover 11 and correspond to the drum cartridges 20, respectively. The light sources 50 are disposed to face the surfaces of the corresponding photosensitive drums 22 in a state in which the drum cartridges 20 are mounted to the main body housing 10 and the cover 11 is at the closed position. Each of the four light sources 50 includes a plurality of light sources arranged in the Y direction. The light sources can emit light toward the outer peripheral surface of the corresponding photosensitive drum 22 with light. The light sources are, for example, an LEDs.

Each light source 50 is electrically connected to the first controller 80. The first controller 80 causes the plurality of light sources of each light source 50 to emit light in accordance with inputted image data. Thus, the light sources emit light toward the outer peripheral surface of the corresponding photosensitive drum 22. As a result, the photosensitive material on the outer peripheral surface of the photosensitive drum 22 is exposed in accordance with the image data.

The communication interface 60 enables communication between the image forming apparatus 1 and the PC 2. The first controller 80 can receive a print job from the PC 2 via the communication interface 60. The print job is a print instruction received by the first controller 80 from an external device such as a PC 2. The first network interface 70 is connected to the server 3 via the network NW. The first controller 80 can communicate with the server 3 via the first network interface 70 and the network NW.

The first controller 80 includes, for example, an ASIC (Application Specific Integrated Circuit). The first controller 80 is electrically connected to the main body memory 13 of the main body housing 10. The first controller 80 executes various processes to cause the image forming apparatus 1 to perform a printing process and one or more processes accompanying the printing process. The first controller 80 may include a processor such as a CPU (Central Processing Unit). In this case, a control program for realizing a control method for the image forming apparatus 1 may be stored in the main body memory 13, and the processor may operate in accordance with the control program so that the first controller 80 causes the image forming apparatus 1 to perform the processes.

The first controller 80 may include a computer-readable recording medium that stores the control program. As the recording medium, a "non-transitory tangible medium" such as a ROM (Read Only Memory), a tape, a disk, a card, a semiconductor memory, and a programmable logic circuit can be used. Further, a RAM (Random Access Memory) or the like for developing the control program may be used. The control program may be supplied to a computer included in the first controller 80 via an arbitrary transmission medium (a communication network, a broadcast wave, or the like) capable of transmitting the control program. One aspect of the present disclosure can also be realized in the form of a data signal embedded in a carrier wave in which the control program is embodied by electronic transmission.

As the drum cartridge 20 and the toner cartridge 30 are mounted to the cartridge holder 12 of the main body housing 10, as shown in FIG. 1, the drum memory 23 and the toner memory 33 are electrically connected to the first controller 80. As a result, the first controller 80 can execute a process of reading information from the drum memory 23 and the toner memory 33 and a process of writing information into the drum memory 23 and the toner memory 33.

The main body housing 10 includes a main body memory 13. The main body memory 13 is a readable and writable memory. The main body memory 13 is, for example, a flash ROM or an EEPROM. The main body memory 13 stores registration information and life information. The registration information includes the drum ID read from the drum memory 23 and the toner ID read from the toner memory 33. The life information includes the drum life information and the toner life information. The drum life information stored in the main body memory 13 is the same as the drum life information stored in the drum memory 23. The toner life information stored in the main body memory 13 is the same as the toner life information stored in the toner memory 33. The main body memory 13 may also store a printer ID. The printer ID is identification information for identifying each image forming apparatus 1, and is, for example, a serial number.

The main body memory 13 stores first mode information, second mode information, and third mode information.

The first mode information is information indicating whether the image forming apparatus 1 is set to the contract mode or to the normal mode. In other words, the first mode information is information indicating whether the control executed by the first controller 80 is for the contract mode or for the normal mode. The first mode information is set to contract information indicating that the image forming apparatus 1 is set to the contract mode or to normal information indicating that the image forming apparatus 1 is set to the normal mode.

The second mode information is information indicating whether a print permission mode is active or inactive. The print permission mode is for permitting printing with the image forming apparatus 1 even in a case where it is determined that one or more of the amounts of remaining toners of one or more of the toner cartridges 30 mounted to the image forming apparatus 1 are in a state in which the cartridge should be replaced. The second mode information is set to active information indicating that the print permission mode is active in the image forming apparatus 1, or to inactive information indicating that the print permission mode is inactive in the image forming apparatus 1. The first controller 80 calculates, as the amount of remaining toner, a value obtained by subtracting the cumulative number of dots at the time of calculation from a prescribed number of dots set to the new toner cartridge 30. Alternatively, the first controller 80 calculates, as the amount of remaining toner, a value obtained by subtracting the cumulative number of rotations at the time of calculation from a prescribed cumulative number of rotations set to the new toner cartridge 30. The first controller 80 determines that the amount of remaining toner is in a state in which the cartridge should be replaced when the prescribed number of dots minus the cumulative number of dots at the time of calculation equals 0 or when the prescribed cumulative number of rotations minus the cumulative number of dots at the time of calculation equals 0. The first controller 80 periodically transmits, for example, remaining amount information indicating the amount of remaining toner to the server 3.

The third mode information is information indicating whether a charging mode is in a first charging mode or in a second charging mode. The first charging mode is a mode in which the server 3 calculates charge for a prescribed time period based on the number of printed sheets and a first charging amount per unit number of sheets which is set by the contract. The second charging mode is a mode in which the server 3 calculates the charge for a predetermined time period based on the number of printed sheets and a second charging amount per unit number of sheets which is set by the contract and set to be lower than the first charging amount. The third mode information is set to first charge information indicating that the charging mode is set to the first charging mode or second charge information indicating that the charging mode is set to the second charging mode.

The first controller 80 sets the second mode information to the active information in a state in which the first mode information is set to the normal information. Therefore, in a state in which the image forming apparatus 1 is set to the normal mode, the first controller 80 can execute printing even in a case where it is determined that the amount of remaining toner is in a state in which the cartridge should be replaced. Since the toner cartridge 30 contains a little more toner than a specified amount, the first controller 80 can execute printing even in a case where it is determined that the amount of remaining toner is in a state in which the cartridge should be replaced. On the other hand, the first controller 80 sets the second mode information to the inactive information in a state in which the first mode information is set to the contract information. Therefore, in a state in which the image forming apparatus 1 is set to the contract mode, the first controller 80 does not execute printing in a case where it is determined that the amount of remaining toner is in a state in which the cartridge should be replaced. In a state in which the first mode information is set to the contract information, the first controller 80 sets the third mode information to the first charge information. Therefore, the server 3 can calculate the charge for the predetermined time period based on the contract.

Figure 3A:
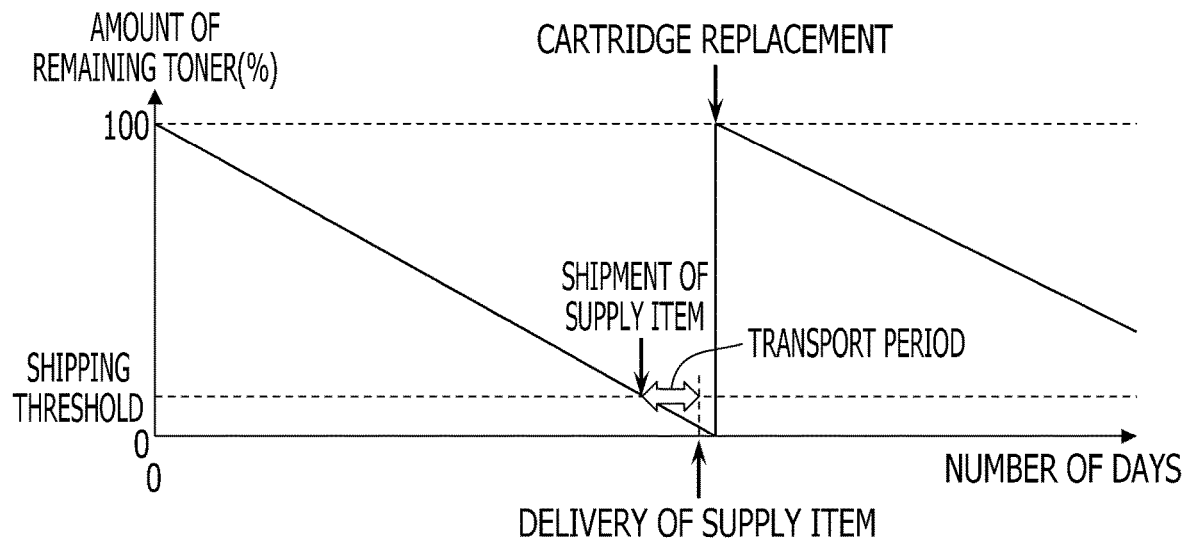
FIG. 3A is a diagram illustrating an example of transition of an amount of remaining toner.
Figure 3B:
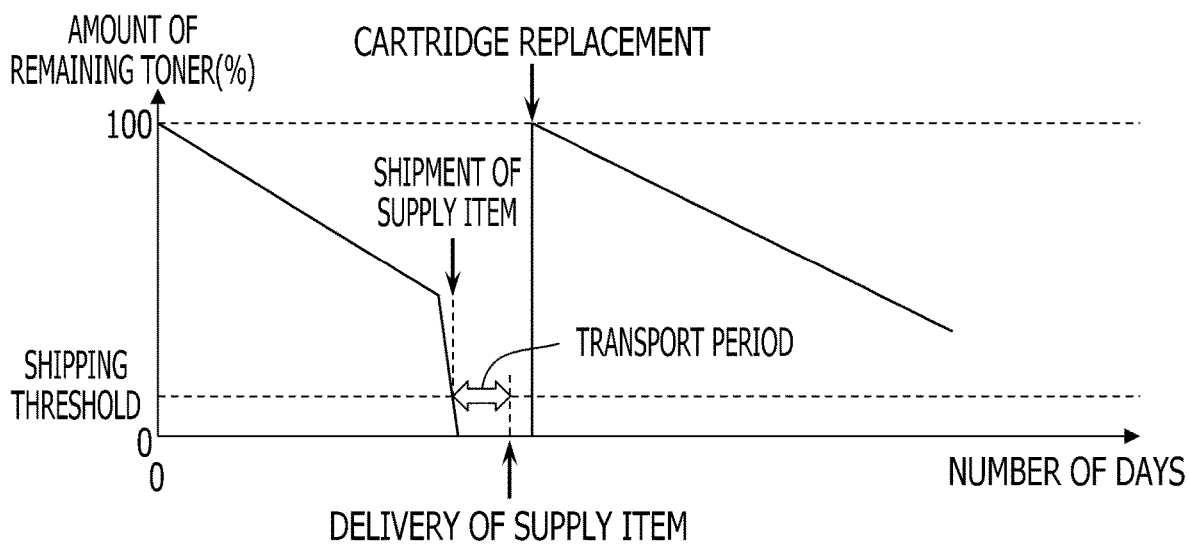
FIG. 3B is a diagram illustrating an example of transition of the amount of remaining toner.

FIGS. 3A and 3B are diagrams illustrating examples of transition of the amount of remaining toner. FIG. 3A shows the transition of the amount of remaining toner in a case where the amount of remaining toner decreases at a constant rate and at a normally assumed rate, and FIG. 3B shows the transition of the amount of remaining toner in a case where the amount of remaining toner decreases rapidly.

In a case where the image forming apparatus 1 is set to the contract mode, as the amount of remaining toner decreases to a shipping threshold described below, the first controller 80 transmits a remaining amount decrease notification described below to the server 3. The shipping threshold is a value of the amount of remaining toner that is set for requesting the server 3 to ship the toner cartridge 30 as a supply item. The remaining amount decrease notification is a notification indicating that the amount of remaining toner of at least one of the toner cartridges 30 mounted to the image forming apparatus 1 is equal to or less than the shipping threshold. When the remaining amount decrease notification is received, the server 3 transmits an instruction to ship the toner cartridge 30 as a supply item to the management apparatus 4 of the warehouse. By shipping the supply item from the warehouse to the user, the user can replace the toner cartridge 30 with the supply item. Therefore, the image forming apparatus 1 can continuously execute printing.

In a case where printing is continuously executed within a range of the number of printed sheets per day that is normally assumed, as illustrated in FIG. 3A, the amount of remaining toner decreases at a constant rate and at a normally assumed rate. As illustrated in FIG. 3A, a decreasing period in which the amount of remaining toner decreases to 0 after decreasing to the shipping threshold is longer than a transport period. The transport period is a period from the shipment of the supply item from the warehouse to the delivery of the supply item to the user and is, for example, a period of about 7 to 14 days. Therefore, in the case illustrated in FIG. 3A, the user can replace the toner cartridge 30 with a supply item before the amount of remaining toner reaches a state in which the cartridge should be replaced.

On the other hand, in a case where printing exceeding the range of the number of printed sheets per day normally assumed is executed, as shown in FIG. 3B, the amount of remaining toner decreases rapidly. As illustrated in FIG. 3B, in a case where the decreasing period is shorter than the transport period, the supply item is not delivered to the user before the amount of remaining toner reaches a state in which the cartridge should be replaced, and the user cannot replace the toner cartridge 30 with the supply item. Therefore, in a case where the image forming apparatus 1 is set to the contract mode and the print permission mode is inactive, the first controller 80 cannot execute printing after the amount of remaining toner reaches a state in which the cartridge should be replaced until the cartridge 30 is replaced with the supply item. In the contract mode, the charge for a predetermined time period is calculated based on the contract. Therefore, even in a state in which printing cannot be executed, the charge for the predetermined time period calculated based on the contract is billed to the user.

In the present embodiment, in a case where the first controller 80 received a first instruction described below from the server 3 in a state in which the first mode information is set to the contract information and the second mode information is set to the inactive information, the first controller 80 executes a first rewriting process described below. The first instruction is an instruction that the server 3 transmits to the image forming apparatus 1 in order to activate the print permission mode. The first rewriting process is a process of rewriting the second mode information from the inactive information to the active information. In a case where the first controller 80 received the first instruction, the first controller 80 can exceptionally activate the print permission mode that is inactive in the contract mode. Therefore, as shown in FIG. 3B, in a state in which the image forming apparatus 1 is set to the contract mode, even in a case where it is determined that the amount of remaining toner is in a state in which the cartridge should be replaced before the supply item is delivered to the user, the first controller 80 can execute printing. Therefore, the first controller 80 can execute printing even in a situation in which the supply item is not delivered to the user and the toner cartridge 30 cannot be replaced.

In the present embodiment, in a case where the first instruction is received and it is determined that the amount of remaining toner is in a state in which the cartridge should be replaced, the first controller 80 rewrites the third mode information to the second charge information. Therefore, charges for printed matters that are printed during a period in which image quality cannot be guaranteed can be discounted.

Configuration of Server 3

The server 3 is a management apparatus that manages an operation state of the image forming apparatus 1. The server 3 includes a second network interface 110, a second controller 120, and a server memory 130.

The second network interface 110 is configured to be connected to the image forming apparatus 1, the PC 2, and/or the management apparatus 4 of the warehouse via the network NW. The second controller 120 is configured to communicate with the image forming apparatus 1 and/or the warehouse management apparatus 4 via the second network interface 110 and the network NW.

The second controller 120 includes, for example, an ASIC (Application Specific Integrated Circuit). The second controller 120 is electrically connected to the server memory 130. The second controller 120 executes various processes to cause the server 3 to execute various operations. Like the first controller 80, the second controller 120 may include a processor such as a CPU or a computer-readable recording medium storing a control program.

The server memory 130 is a readable and writable memory. The server memory 130 stores, for example, number-of-days information indicating a number of days from receipt of the remaining amount decrease notification from the image forming apparatus 1. The server memory 130 stores the remaining amount information that are periodically transmitted from the image forming apparatus 1 and the like.

The second controller 120 sets the number-of-days information to 0 in a case where the remaining amount decrease notification is received in a state in which the image forming apparatus 1 is set to the contract mode, and then increments the number-of-days information every time the date is updated. In addition, in a case where the remaining amount decrease notification is received, the second controller 120 transmits a shipment instruction of the supply item to the management apparatus 4 of the warehouse.

In a state in which the image forming apparatus 1 is set to the contract mode and the print permission mode is inactive, when the remaining amount decrease notification is received, the second controller 120 executes a switching process described below. The switching process is a process of switching the print permission mode from inactive to active. Therefore, the server 3 can cause the image forming apparatus 1 to exceptionally execute printing even in a case where it is determined that the amount of remaining toner is in a state in which the cartridge should be replaced in a state in which the image forming apparatus 1 is set to the contract mode. As an example of the switching process, the second controller 120 executes a third transmission process of transmitting the first instruction to the image forming apparatus 1.

When the third mode information is set to the first charge information, the second controller 120 calculates charge amount for a prescribed time period based on a first charge and the number of printed sheets. In a case where the third mode information is set to the second charge information, the second controller 120 calculates the charge for the prescribed time period based on a second charge and the number of printed sheets. Specifically, the second controller 120 calculates the charge for the prescribed time period as described below.

As an example, a case where the first charge and the second charge are set as charge per sheet will be described. For a first period in which the third mode information is set to the first charge information, the second controller 120 calculates charge in the first period by multiplying the first charge by the number of printed sheets during the first period. For the second period in which the third mode information is set to the second charge information, the second controller 120 calculates charge in the second period by multiplying the second charge by the number of printed sheets during the second period. The second controller 120 calculates a total of the charge in the first period and the charge in the second period as charge in the prescribed time period.

In addition, the second controller 120 may receive the third mode information from the image forming apparatus 1 every time the second controller 120 receives information indicating the number of printed sheets from the image forming apparatus 1. When the third mode information is set to the first charge information, the second controller 120 adds a value obtained by multiplying the first charge by the number of printed sheets to the latest cumulative charge. When the third mode information is set to the second charge information, the second controller 120 adds a value obtained by multiplying the second charge by the number of printed sheets to the latest cumulative charge. The second controller 120 calculates the cumulative charge at the time the prescribed time period elapsed as charge for the prescribed time period.

Processes by Image Forming Apparatus and Server

Example of Switching from Normal Mode to Contract Mode

Figure 4:
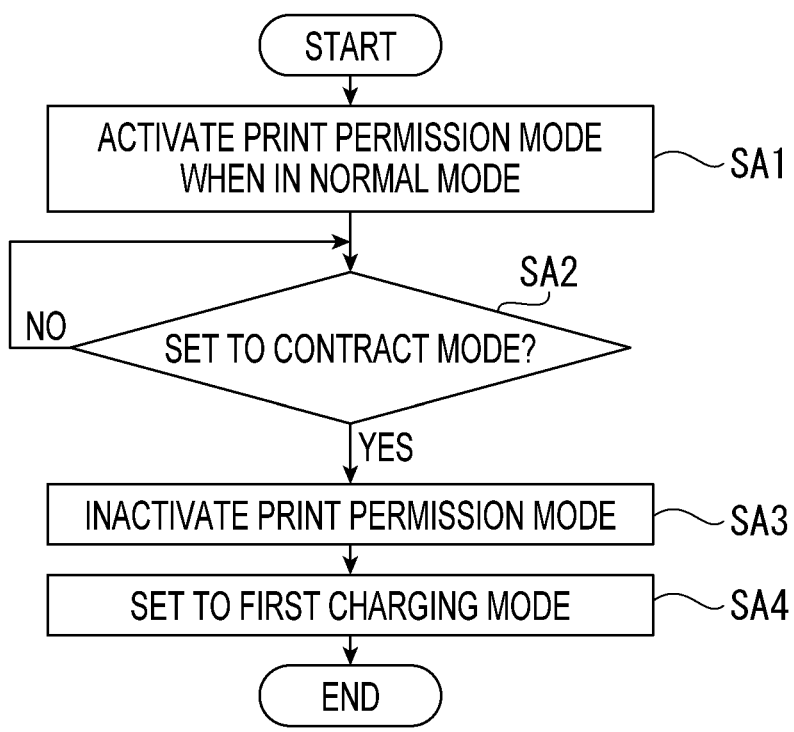
FIG. 4 is a flowchart illustrating an example of processes performed by the image forming apparatus when switching from a normal mode to a contract mode.

FIG. 4 is a flowchart illustrating an example of processes performed by the image forming apparatus 1 when switching from the normal mode to the contract mode. As shown in FIG. 4, in SA1, the first controller 80 executes a first setting process of setting the second mode information to the active information in a state in which the first mode information is set to the normal information. The first setting process may be executed before shipment of the image forming apparatus 1. After the process of SA1, in SA2, the first controller 80 determines whether the first mode information has been rewritten to the contract information as a result of making a service contract for the image forming apparatus 1. In a case where it is determined that the first mode information has been rewritten to the contract information (SA2: YES), in SA3, the first controller 80 executes a second setting process of setting the second mode information to the inactive information. In SA4, the first controller 80 sets the third mode information of the image forming apparatus 1 to the first charge information. The first controller 80 repeats the process of SA2 in a case where SA2 is NO, that is, until the service contract is made.

Exemplary Process 1

Figure 5A:
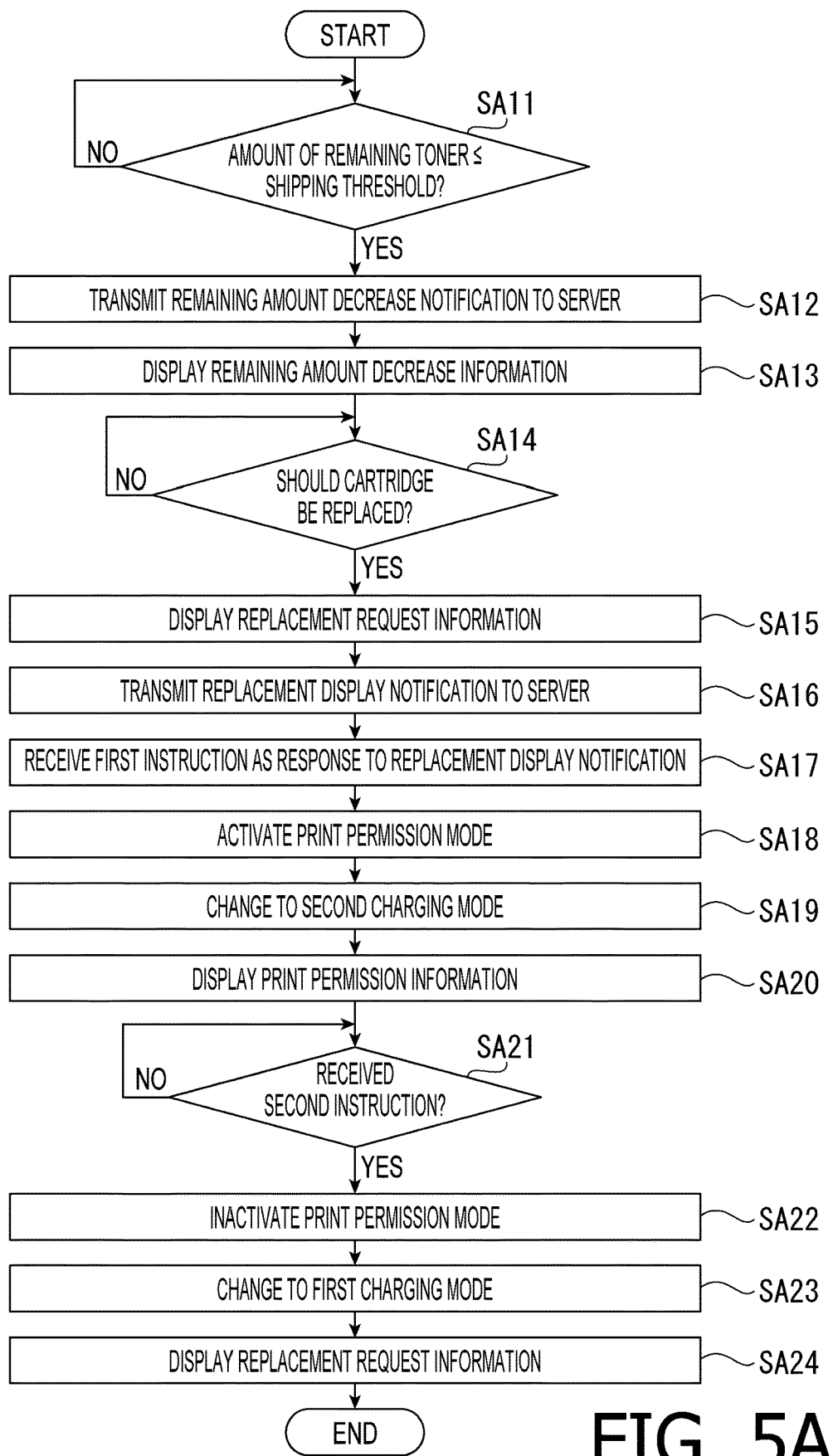
FIG. 5A is a flowchart illustrating an example of processes by the image forming apparatus in the contract mode.
Figure 5B:
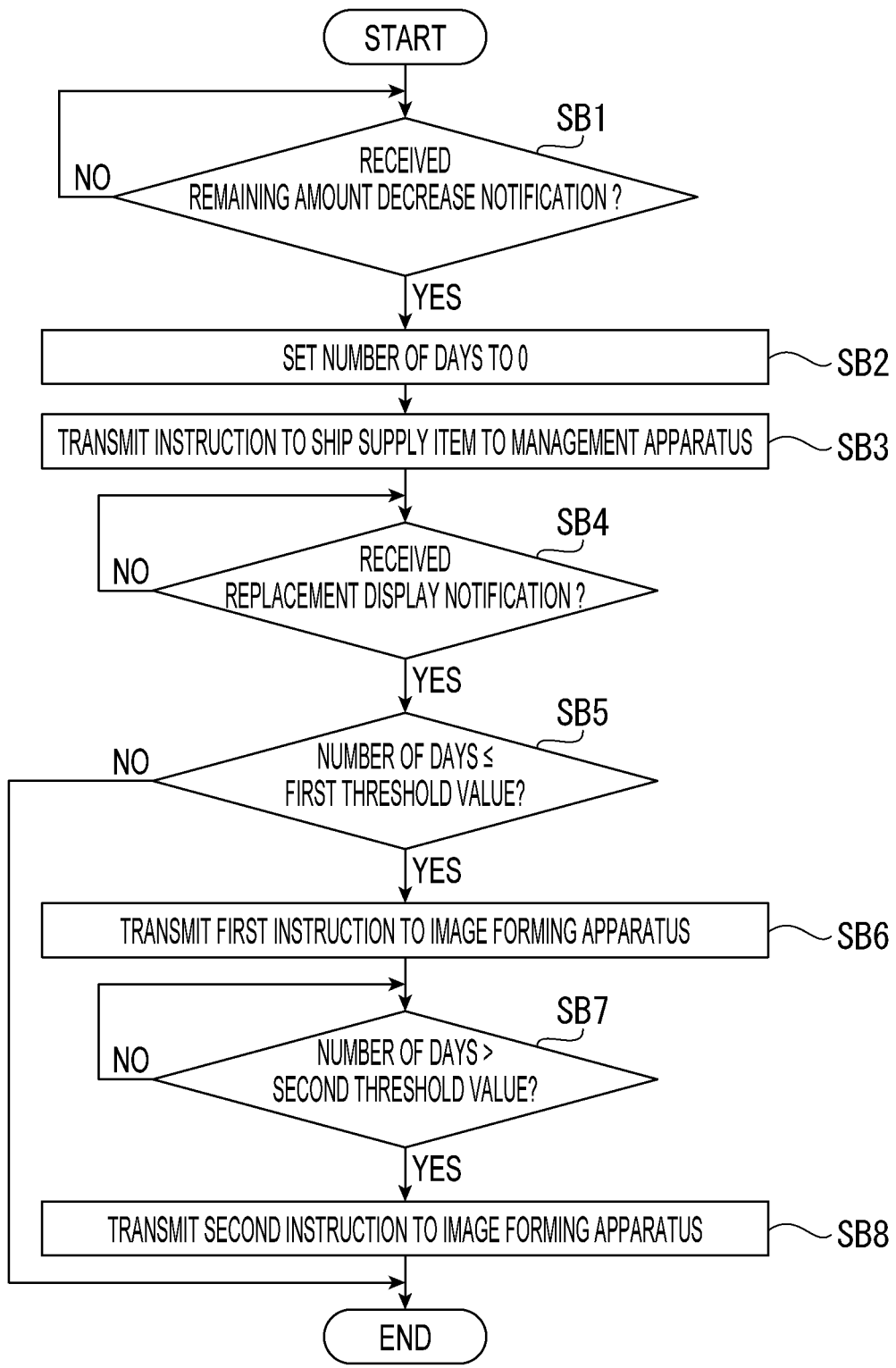
FIG. 5B is a flowchart illustrating an example of processes by a server in the contract mode.

FIG. 5A is a flowchart illustrating an example of processes by the image forming apparatus 1 in the contract mode, and FIG. 5B is a flowchart illustrating an example of processes by the server 3 in the contract mode. The processes illustrated in FIG. 5A are to be executed by the image forming apparatus 1 after the processes illustrated in FIG. 4. The processes shown in FIG. 5B are to be executed by the server 3 after the image forming apparatus 1 transmits the remaining amount decrease notification to the server 3 in the processes shown in FIG. 5A.

Processes by Image Forming Apparatus

As shown in FIG. 5A, in SA11, the first controller 80 determines whether the amount of remaining toner is equal to or less than the shipping threshold. When it is determined that the amount of remaining toner is equal to or less than the shipping threshold (SA11: YES), the first controller 80 transmits the remaining amount decrease notification to the server 3 in SA12. The server 3 can transmit the instruction to ship the supply item of the toner cartridge 30 to the management apparatus 4 of the warehouse in a case where the remaining amount reduction notification is received. In SA13, the first controller 80 displays, on the touch panel 90, remaining amount decrease information indicating that the amount of remaining toner has decreased to the shipping threshold. When the first controller 80 displays the remaining amount decrease information on the touch panel 90, the user can recognize that the amount of remaining toner is in a state in which the cartridge should be replaced shortly. The first controller 80 repeats the process of SA11 in a case where SA11 is NO, that is, until the amount of remaining toner becomes equal to or less than the shipping threshold.

After the process of SA13, in SA14, the first controller 80 determines whether the amount of remaining toner has reached an amount at which the cartridge should be replaced. In a case where it is determined that the amount of remaining toner is in a state in which the cartridge should be replaced (SA14: YES), the first controller 80 displays the following replacement request information on the touch panel 90 in SA15. The replacement request information is information for requesting the user to replace the toner cartridge 30. When the first controller 80 displays the replacement request information on the touch panel 90, the user can recognize that the toner cartridge 30 needs to be replaced. In SA16, the first controller 80 executes a first transmission process of transmitting a replacement display notification described below to the server 3. The replacement display notification is a notification indicating that it has been determined that the amount of remaining toner is in a state in which the cartridge should be replaced and the request to replace the toner cartridge 30 has been displayed. When the first controller 80 executes the first transmission process, the server 3 can determine whether or not transmission of the first instruction is necessary with the reception of the replacement display notification as a trigger. The first controller 80 repeats the process of SA14 in a case where SA14 is NO, that is, until the amount of remaining toner becomes in a state in which the cartridge should be replaced.

After the process of SA16, in SA17, the first controller 80 receives the first instruction from the server 3 as a response to the replacement display notification. In SA18, the first controller 80 executes the first rewriting process of rewriting the second mode information to the active information.

In the processes illustrated in FIGS. 5A and 5B, the first instruction is transmitted from the server 3 in a case where the first controller 80 determines that the amount of remaining toner is in a state in which the cartridge should be replaced and in a case where the server 3 determines that the number of days normally required to deliver the supply item has not elapsed. Therefore, in a case where the image forming apparatus 1 receives the first instruction, the supply item is not arrived yet, and the user cannot replace the toner cartridge 30. Furthermore, since the second mode information is set to the inactive information, the first controller 80 cannot execute printing.

In SA18, the first controller 80 executes the first rewriting process. Therefore, in a situation in which the amount of remaining toner is in a state in which the cartridge should be replaced and the supply item has not yet been delivered to the user, the first controller 80 can exceptionally activate the print permission mode. Thus, the first controller 80 can execute printing in the above situation. In addition, by way of the communication with the server 3, the first controller 80 can execute the first rewriting process with the transmission of the replacement display notification as a trigger.

In SA19, the first controller 80 executes a second rewriting process of rewriting the third mode information to the second charge information. That is, the first controller 80 executes the second rewriting process when executing the first rewriting process. In the process of SA19, the first controller 80 can set printed matters whose image qualities cannot be guaranteed as targets of charge discount.

In SA20, the first controller 80 displays, on the touch panel 90, print permission information indicating that the image forming apparatus 1 is in a state in which the second charging mode is set and printing is permitted although image quality cannot be guaranteed. By displaying the print permission information on the touch panel 90, the user can recognize that the image quality is not guaranteed but printing can be executed at a discount price.

After the process of SA20, in SA21, the first controller 80 determines whether the second instruction to inactivate the print permission mode is received. In a case where it is determined that the second instruction is received (SA21: YES), the first controller 80 executes, in SA22, a third rewriting process of rewriting the second mode information to the inactive information.

The second instruction is transmitted from the server 3 when the server 3 determines that the maximum number of days assumed as the number of days required for the delivery of the supply item has elapsed. The maximum number of days is equal to or greater than the number of days required for normal delivery and is, for example, equal to or more than 14 days. In a case where the maximum number of days has elapsed, it can be assumed that the supply item has already been delivered to the user and the toner cartridge 30 can be replaced. Therefore, in SA22, the first controller 80 can again inactivate the print permission mode that has been exceptionally activated in a state in which the image forming apparatus 1 is in the contract mode to reduce the possibility that printing is continuously executed in a state in which the image quality cannot be guaranteed.

In a case where it is determined that the second instruction is received (SA21: YES), the first controller 80 executes, in SA23, a fourth rewriting process of rewriting the third mode information to the first charge information. That is, the first controller 80 switches the charging mode from the second charging mode to the first charging mode. Therefore, the possibility that the charge is calculated in the second charging mode even after the supply item is attached to the image forming apparatus 1 can be reduced.

In SA24, as in SA15, the first controller 80 displays the replacement request information on the touch panel 90. In a case where SA21 is NO, that is, until the first controller 80 receives the second instruction, the first controller 80 repeats the process of SA21.

Process by Server

As illustrated in FIG. 5B, in SB1, the second controller 120 determines whether the remaining amount decrease notification is received from the image forming apparatus 1. In a case where it is determined that the remaining amount decrease notification is received (SB1: YES), the second controller 120 sets, in SB2, the number of days indicated in the number-of-days information to 0 and starts counting the number of days. The second controller 120 can count the number of days since the supply item was shipped by starting counting the number of days. In SB3, the second controller 120 transmits the instruction to ship the supply item to the management apparatus 4 of the warehouse. The supply item is shipped from the warehouse in a case where the second controller 120 transmits the instruction to ship the supply item to the management apparatus 4, that is, the amount of remaining toner becoming equal to or less than the shipping threshold as a trigger. The second controller 120 repeats the process of SB1 in a case where SB1 is NO, that is, until the remaining amount decrease notification is received.

After the process of SB3, in SB4, the second controller 120 determines whether the replacement display notification is received from the image forming apparatus 1. In a case where it is determined that the replacement display notification is received (SB4: YES), the second controller 120 determines, in SB5, whether the number of days indicated by the number-of-days information is less than the first threshold value. The first threshold value indicates the number of days from the shipping of the supply item from the warehouse to the delivery of the supply item to the user required for normal delivery, and is set to, for example, 14 days. The first threshold value is a value that is common to all users.

In a case where it is determined that the number of days indicated by the number-of-days information is less than the first threshold value (SB5: YES), the second controller executes, in SB6, the third transmission process of transmitting the first instruction to the image forming apparatus 1. That is, when the replacement display notification is received from the image forming apparatus 1, when the number of days indicated in the number-of-days information is less than the first threshold value, the second controller 200 executes the third transmission process.

In a case where SB5 is YES, the second controller 120 can determine that the supply item has not yet delivered to the user even though it is determined that the amount of remaining toner is a state in which the cartridge should be replaced in a state in which the image forming apparatus 1 is set to the contract mode. In this case, the second controller 120 transmits the first instruction to the image forming apparatus 1. Therefore, the second controller 120 can exceptionally cause the image forming apparatus 1 to execute printing even in a case where it is determined that the amount of remaining toner is in a state in which the cartridge should be replaced in a state in which the image forming apparatus 1 is set to the contract mode.

In a case where the second controller 120 receives the remaining amount decrease notification from the image forming apparatus 1, the second controller 120 transmits the first instruction and the image forming apparatus 1 rewrites the second mode information from the inactive information to the active information. In other words, in a case where the remaining amount decrease notification is received, in the process of SB6, the second controller 120 executes a switching process of switching the print permission mode of the image forming apparatus 1 from the inactive information to the active information. The second controller 120 executes the switching process in the process of SB6 in a case where it is determined that the number of days indicated by the number-of-days information is less than the first threshold value.

The second controller 120 repeats the process of SB4 in a case where SB4 is NO, that is, until the replacement display notification is received. In addition, in a case where it is determined that the number of days indicated in the number-of-days information is equal to or greater than the first threshold value (SB5: NO), the second controller 120 can determine that the supply item has already been delivered to the user. Therefore, the second controller 120 terminates the process without transmitting the first instruction. In the image forming apparatus 1, since the first instruction is not received, the state in which the second mode information is set to the inactive information is maintained in a state in which the image forming apparatus 1 is set to the contract mode.

After the process of SB6, in SB7, the second controller 120 determines whether the number of days indicated in the number-of-days information is greater than the second threshold value. The second threshold value is a value set as a value equal to or greater than the first threshold value. The second threshold value indicates the above-described maximum number of days, and is set to, for example, a number of days equal to or greater than 14 days. The second threshold value is a value set for every user while taking into consideration situations of the user such as natural disasters.

In a case where it is determined that the number of days indicated in the number-of-days information is greater than the second threshold value (SB7: YES), the second controller 120 executes, in SB8, a fourth transmission process of transmitting the second instruction to the image forming apparatus 1. The image forming apparatus 1 can switch the print permission mode from the exceptionally activated state to the inactive state again by receiving the second instruction from the server 3. Further, the image forming apparatus 1 can switch the charging mode exceptionally set to the second charging mode to the first charging mode again by receiving the second instruction from the server 3. The second controller 120 repeats the process of SB7 in a case where SB7 is NO, that is, until the number of days indicated in the number-of-days information exceeds the second threshold value.

Exemplary Process 2

Figure 6A:
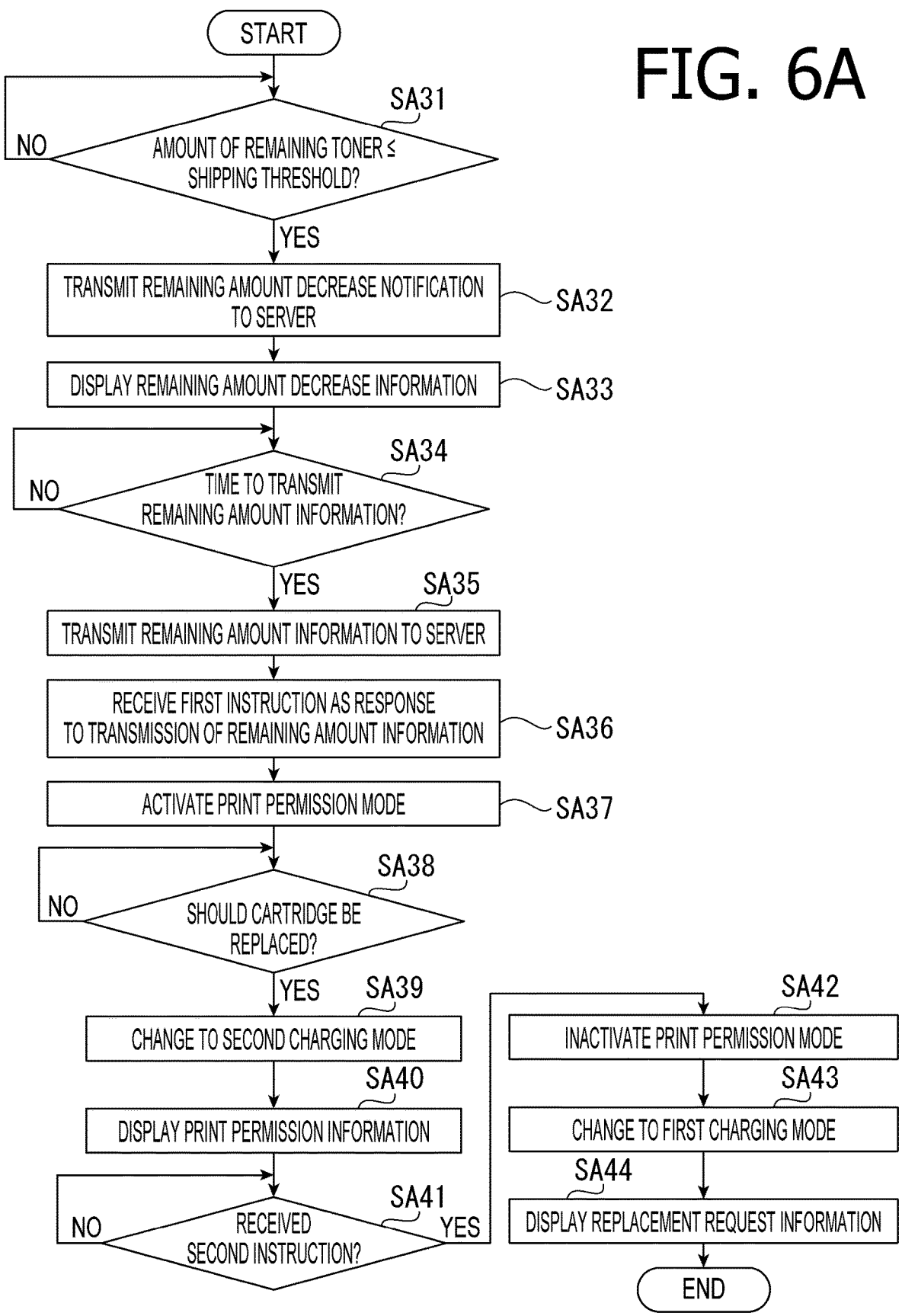
FIG. 6A is a flowchart illustrating another example of processes by the image forming apparatus in the contract mode.
Figure 6B:
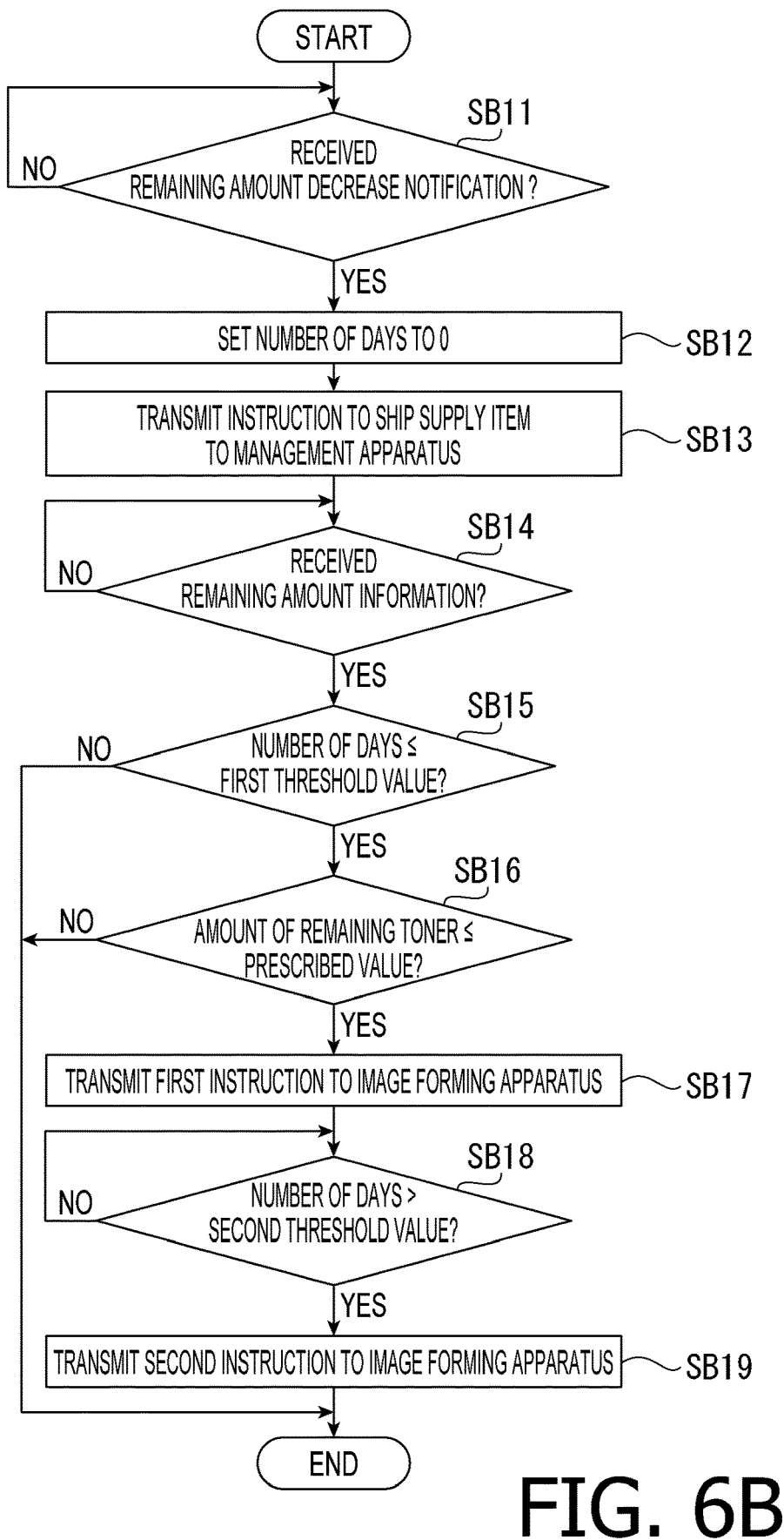
FIG. 6B is a flowchart illustrating another example of processes by the server in the contract mode.

FIG. 6A is a flowchart illustrating another example of processes by the image forming apparatus 1 in the contract mode, and FIG. 6B is a flowchart illustrating another example of processes by the server 3 in the contract mode. The processes shown in FIG. 6A are processes to be executed by the image forming apparatus 1 after the processes of FIG. 4. The processes shown in FIG. 6B are processes to be executed by the server 3 after the image forming apparatus 1 transmits the remaining amount decrease notification to the server 3 in the processes of the image forming apparatus 1 shown in FIG. 6A.

Processes by Image Forming Apparatus

As shown in FIG. 6A, the first controller 80 executes processes of SA31 to SA33. The processes of SA31 to SA33 are the same as the processes of SA11 to SA13 shown in FIG. 5A.

After the process of the SA31, in SA34, the first controller 80 determines whether it is time for a periodic transmission of remaining amount information. In a case where it is determined that it is time for the periodic transmission of the remaining amount information (SA34: YES), the first controller 80 executes, in SA35, a second transmission process of transmitting the remaining amount information to the server 3. That is, the first controller 80 executes the second transmission process after the amount of remaining toner becomes equal to or less than the shipping threshold. In a case where SA34 is NO, that is, until it becomes time for the periodic transmission of the remaining amount information, the first controller 80 repeats the process of SA34.

After the process of SA35, in SA36, the first controller 80 receives the first instruction from the server 3 as a response to the transmission of the remaining amount information. In SA37, the first controller 80 executes the first rewriting process of rewriting the second mode information to the active information.

In the processes illustrated in FIGS. 6A and 6B, the first instruction is transmitted from the server 3 in a case where the server 3 determines that the amount of remaining toner is equal to or less than the shipping threshold and equal to or less than the prescribed value, and the number of days required for normal delivery of the supply item has not elapsed. The prescribed value is a value of the amount of remaining toner set for each number of days indicated by the number-of-days information, and is a value that is set such that the amount of remaining toner when the supply item is delivered to the user is not determined to be a state in which the cartridge should be replaced. Therefore, when the image forming apparatus 1 receives the first instruction, it can be assumed that the amount of remaining toner is in a state in which the cartridge should be replaced within a short period of time. If the supply item has not yet been delivered to the user although it is assumed that the cartridge should be replaced within a short period of time and the second mode information remains set to the inactive information, the first controller 80 cannot execute printing.

In SA37, the first controller 80 executes the first rewriting process. Therefore, the first controller 80 can exceptionally activate the print permission mode in a situation in which it can be assumed that the amount of remaining toner is in a state in which the cartridge should be replaced and the supply item has not yet been delivered to the user. Therefore, the first controller 80 can execute printing even in a case where it is determined that the amount of remaining toner is in a state in which the cartridge should be replaced and the toner cartridge 30 cannot be replaced. Furthermore, the first controller 80 can execute the first rewriting process with the transmission of the remaining amount information by way of the communication with the server 3 after the amount of remaining toner becomes equal to or less than the sending threshold value as a trigger.

After the process of SA37, in SA38, the first controller 80 executes a determination process of determining whether the amount of remaining toner is in a state in which the cartridge should be replaced. That is, the first controller 80 executes the determination process in a case where the first instruction is received from the server 3. Therefore, the first controller 80 can execute the determination process by communicating with the server 3. In a case where it is determined that the amount of remaining toner is in the state in which the cartridge should be replaced (SA38: YES), the first controller 80 executes, in SA39, the second rewriting process of rewriting the third mode information to the second charge information. By the process of SA39, the first controller 80 can set printed matters whose image qualities cannot be guaranteed as targets of charge discount. The first controller 80 repeats the process of SA38 in a case where SA38 is NO, that is, until the amount of remaining toner reaches a state in which the cartridge should be replaced.

In SA40, the first controller 80 displays print permission information on the touch panel 90. After the process of SA40, the first controller 80 executes processes of SA41 to SA44. The processes of SA41 to SA44 is the same as the processes of SA21 to SA24 shown in FIG. 5A.

In the process shown in FIG. 5A, the first controller 80 activates the print permission mode after determining that the amount of remaining toner has reached a state in which the cartridge should be replaced. Therefore, the first controller 80 once displays the replacement request information in SA15, and then switches the display to the print permission information in SA20. On the other hand, in the process shown in FIG. 6A, the first controller 80 determines whether the amount of remaining toner is in a state in which the cartridge should be replaced after the print permission mode is activated. Therefore, the first controller 80 can display the print permission information without once displaying the replacement request information.

Processes by Server

As shown in FIG. 6B, the second controller 120 executes processes of SB11 to SB13. The processes of SB11 to SB13 are the same as the processes of SB1 to SB3 shown in FIG. 5B.

After the processes of SB13, in the SB14, the second controller 120 determines whether the remaining amount information is received from the image forming apparatus 1. In a case where it is determined that the remaining amount information is received (SB14: YES), the second controller 120 determines, in SB15, whether the number of days indicated by the number-of-days information is less than the first threshold value.

In a case where it is determined that the number of days indicated by the number-of-days information is less than the first threshold value (SB15: YES), the second controller 120 determines, in SB16, whether the amount of remaining toner is equal to or less than a prescribed value. In a case where it is determined that the amount of remaining toner is equal to or less than a prescribed value (SB16: YES), the second controller executes, in SB17, the third transmission process of transmitting the first instruction to the image forming apparatus 1. That is, when the remaining amount information is received from the image forming apparatus 1, if the number of days indicated by the number-of-days information is less than the first threshold value and the remaining amount indicated by the remaining amount information is equal to or less than the prescribed value, the second controller 120 executes the third transmission process.

In a case where SB15 is YES, the second controller 120 can determine that the image forming apparatus 1 is set to the contract mode and it can be assumed that the amount of remaining toner is in a state in which the cartridge should be replaced in a short period of time but the supply item has not yet been delivered to the user. In the above-described state, the second controller 120 transmits the first instruction to the image forming apparatus 1 so that the image forming apparatus 1 can exceptionally execute printing.

The second controller 120 repeats the process of SB14 in a case where SB14 is NO, that is, until the remaining amount information is received. In a case where it is determined that the number of days indicated in the number-of-days information is equal to or greater than the first threshold value (SB15: NO), it can be assumed that the supply item has already been delivered to the user. Therefore, the second controller 120 terminates the process without transmitting the first instruction. In a case where it is determined that the amount of remaining toner is greater than the predetermined value (SB16: NO), it can be assumed that the supply item will be delivered to the user before the amount of remaining toner reaches a state in which the cartridge should be replaced. Therefore, the second controller 120 terminates the process without transmitting the first instruction.

After the process of SB17, the first controller 80 executes processes of SB18 to SB19. The processes of SB18 to SB19 are the same as the processes of SB7 to SB8 shown in FIG. 5B.

Supplementary Note

The image forming apparatus 1 described above is an electrophotographic printer, but may be an inkjet printer. In the case of an ink jet printer, an ink cartridge for supplying ink may be used. In this case, the content of the present disclosure is applied to the ink cartridge. Further, a tape cassette for supplying a tape as a printing base material may be used. In this case, the content of the present disclosure is applied to the tape cartridge. Further, aspects of the present disclosure are not limited to the above-described configuration in which the drum cartridge 20 includes the photosensitive drum 22 and the toner cartridge 30 includes the developing roller 32.

First Variation

For example, as a first variation, the drum cartridge 20 may include the developing roller 32 in addition to the cartridge housing 21, the photosensitive drum 22, and the drum memory 23. In this case, the photosensitive drum 22, the drum memory 23, and the developing roller 32 are provided in the cartridge housing 21. In the first variation, the toner cartridge 30 includes the cartridge housing 31 and the toner memory 33, but does not include the developing roller 32. The cartridge housing 31 contains toner. The outer peripheral surface of the developing roller 32 contacts the outer peripheral surface of the photosensitive drum 22 inside the drum cartridge 20.

Second Variation

As a second variation, the image forming apparatus 1 may further include a not-shown developing cartridge including the developing roller 32. In this case, the drum cartridge 20 includes the cartridge housing 21, the photosensitive drum 22, and the drum memory 23. The toner cartridge 30 includes the cartridge housing 31 and the toner memory 33, but does not include the developing roller 32. The cartridge housing 31 contains toner. In the second variation, the three components, that is, the drum cartridge 20, the toner cartridge 30, and the developing cartridge, are held by the cartridge holder 12, whereby the three components are mounted to the main body housing 10.

Third Variation

Further, as a third variation, the image forming apparatus 1 may include a not-shown single cartridge instead of the drum cartridge 20 and the toner cartridge 30. In this case, the single cartridge includes a cartridge housing, the photosensitive drum 22, a memory, and the developing roller 32. The outer peripheral surface of the developing roller 32 contacts the outer peripheral surface of the photosensitive drum 22 inside the single cartridge. The cartridge housing of the single cartridge contains toner.

Fourth Variation

Further, as a fourth variation, the contents of the present disclosure may be applied to the drum cartridge 20 or the transfer belt 40 as the cartridge instead of the toner cartridge 30.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well-known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein.

The drum cartridge 20, the toner cartridge 30, the ink cartridge, and the tape cassette in the above-described embodiments and variations are examples of a cartridge according to aspects of the present disclosures. The toner and the ink in the above-described embodiments and variations are examples of coloring agent according to aspects of the present disclosures. The third transmission process in the above-described embodiment is an example of switching according to aspects of the present disclosures.

What is claimed is:

1. An image forming apparatus communicable with a server, the image forming apparatus comprising:
   a main body memory configured to store:
      first mode information indicating whether the image forming apparatus is set to a contract mode being for the image forming apparatus for which a service contract is made or a normal mode being for the image forming apparatus for which a service contract is not made;
      second mode information indicating whether a print permission mode for permitting printing with the image forming apparatus even in a case where it is determined that an amount of remaining coloring agent contained in a cartridge mounted to the image forming apparatus is in a state in which the cartridge should be replaced is active or inactive; and
      third mode information indicating whether the server is in a first charging mode or in a second charging mode, the first charging mode being a mode in which the server calculates charge for a prescribed time period based on a first charge per unit number of sheets set by the contract and a number of printed sheets, and the second charging mode being a mode in which the server calculates the charge for the prescribed time period based on a second charge per unit number of sheets set by the contract and the number of printed sheets, the second charge being set to be lower than the first charge, and
   a controller comprising a circuit, the controller configured to execute:
      setting the second mode information to active information indicating that the print permission mode is active in a state in which the first mode information indicates the normal mode;
      setting the second mode information to inactive information indicating that the print permission mode is inactive in a state in which the first mode information indicates the contract mode;
      transmitting a replacement display notification indicating that a cartridge replacement request is to be displayed in a case where it is determined that the amount of remaining coloring agent is in a state in which the cartridge should be replaced; and
      rewriting the second mode information from the inactive information to the active information in a case where a first instruction to activate the print permission mode is received in a state in which the first mode information indicates the contract mode and the second mode information is set to the inactive information,
   wherein rewriting the second mode information from the inactive information to the active information is executed in a case where the first instruction is received from the server; and
   rewriting the third mode information into information indicating the second charging mode when executing the rewriting the second mode information from the inactive information to the active information in a state in which the third mode information indicates the first charging mode.

2. The image forming apparatus according to claim 1, wherein the image forming apparatus is communicable with a server, and
   wherein the controller is configured to:
      transmit, in the transmitting the replacement display notification, the replacement display notification to the server, and
      execute the rewriting the second mode information from the inactive information to the active information in a case where the first instruction is received from the server.

3. The image forming apparatus according to claim 1, wherein the main body memory stores remaining amount information indicating the amount of remaining coloring agent, and
   wherein the controller is configured to execute:
      transmitting the remaining amount information after the amount of remaining coloring agent becomes equal to or less than a shipping threshold; and
      the rewriting the second mode information from the inactive information to the active information in a case where the first instruction is received as a response to the transmission of the remaining amount information.

4. The image forming apparatus according to claim 3, wherein the image forming apparatus is communicable with a server, and
   wherein the controller is configured to:

transmit, in the transmitting the remaining amount information, the remaining amount information to the server; and executes the rewriting the second mode information from the inactive information to the active information in a case where the first instruction is received from the server.

5. The image forming apparatus according to claim 4,
wherein the main body memory stores third mode information indicating whether the server is in a first charging mode or in a second charging mode, the first charging mode being a mode in which the server calculates charge for a prescribed time period based on a first charge per unit number of sheets set by the contract and a number of printed sheets, and the second charging mode being a mode in which the server calculates the charge for the prescribed time period based on a second charge per unit number of sheets set by the contract and the number of printed sheets, the second charge being set to be lower than the first charge,
wherein the controller is configured to execute:
determining whether the amount of remaining coloring agent is in a state in which the cartridge should be replaced in a case where the first instruction is received in a state in which the third mode information indicates the first charging mode; and
rewriting the third mode information into information indicating the second charging mode in a case where it is determined that the amount of remaining coloring agent reached a state in which the cartridge should be replaced.

6. The image forming apparatus according to claim 5,
wherein the controller is configured to execute the determining whether the amount of remaining coloring agent is in a state in which the cartridge should be replaced in a case where the first instruction is received from the server.

7. The image forming apparatus according to claim 1,
wherein the controller is configured to execute:
rewriting the second mode information from the active information to the inactive information in a case where a second instruction to inactivate the print permission mode is received after executing the first rewriting process; and
rewriting the third mode information into information indicating the first charging mode when executing the rewriting the second mode information from the active information to the inactive information.

8. The image forming apparatus according to claim 1, wherein the cartridge is a toner cartridge.

9. A server communicable with an image forming apparatus,
the server comprising a controller comprising a circuit, the controller configured to execute:
transmitting a first instruction from the server to the image forming apparatus to switch the print permission mode in the image forming apparatus from inactive to active in a case where a remaining amount decrease notification indicating that the amount of remaining coloring agent is equal to or less than a dispatch threshold is received from the image forming apparatus,
in a state in which the image forming apparatus is set to a contract mode for the image forming apparatus for which a service contract is made and in which a print permission mode for permitting printing with the image forming apparatus even in a case where it is determined that an amount of remaining coloring agent contained in a cartridge mounted to the image forming apparatus is in a state in which the cartridge is to be replaced is inactive;
wherein the server further includes a server memory configured to store number-of-days information indicating a number of days from receipt of the remaining amount decrease notification is received from the image forming apparatus, and
wherein the controller is configured to execute the switching in a case where the number of days is less than a first threshold.

10. The server according to claim 9,
wherein the controller is configured to, in the switching, transmit the first instruction to activate the print permission mode to the image forming apparatus in a case where the number of days is less than a first threshold value when a replacement display notification is received from the image forming apparatus, the replacement display notification indicating that a cartridge replacement request is to be displayed in a case where it is determined that the amount of remaining coloring agent is in a state in which the cartridge should be replaced.

11. The server according to claim 9,
wherein the controller is configured to, in the switching, transmit the first instruction to activate the print permission mode to the image forming apparatus in a case where, the number of days is less than a first threshold value and the amount of remaining coloring agent indicated by the remaining amount information is equal to or less than a prescribed value, when remaining amount information indicating the amount of remaining coloring agent is received from the image forming apparatus after the remaining amount decrease notification is received.

12. The server according to claim 9,
wherein the controller is configured to execute transmitting a second instruction to inactivate the print permission mode to the image forming apparatus in a case where the number of days is greater than a second threshold value set as a value equal to or greater than the first threshold value.

13. An image forming apparatus communicable with a server, the image forming apparatus comprising:
a main body memory configured to store:
first mode information indicating whether the image forming apparatus is set to a contract mode being for the image forming apparatus for which a service contract is made or a normal mode being for the image forming apparatus for which a service contract is not made;
second mode information indicating whether a print permission mode for permitting printing with the image forming apparatus even in a case where it is determined that an amount of remaining coloring agent contained in a cartridge mounted to the image forming apparatus is in a state in which the cartridge should be replaced is active or inactive;
third mode information indicating whether the server is in a first charging mode or in a second charging mode, the first charging mode being a mode in which the server calculates charge for a prescribed time period based on a first charge per unit number of sheets set by the contract and a number of printed sheets, and the second charging mode being a mode in which the server calculates the charge for the prescribed time period based on a second charge per unit number of sheets set by the contract and the number of printed sheets, the second charge being set to be lower than the first charge; and remaining amount information indicating the amount of remaining coloring agent; and a controller comprising a circuit, the controller configured to execute:

setting the second mode information to active information indicating that the print permission mode is active in a state in which the first mode information indicates the normal mode;

setting the second mode information to inactive information indicating that the print permission mode is inactive in a state in which the first mode information indicates the contract mode;

transmitting the remaining amount information to the server after the amount of remaining coloring agent becomes equal to or less than a shipping threshold; and rewriting the second mode information from the inactive information to the active information in a case where a first instruction to activate the print permission mode is received from the server as a response to the transmission of the remaining amount information and the first mode information indicates the contract mode and the second mode information is set to the inactive information;

determining whether the amount of remaining coloring agent is in a state in which the cartridge should be replaced in a case where the first instruction is received in a state in which the third mode information indicates the first charging mode; and rewriting the third mode information into information indicating the second charging mode in a case where it is determined that the amount of remaining coloring agent reached a state in which the cartridge should be replaced.

* * * * *